US012340349B2

(12) United States Patent
Matsutani

(10) Patent No.: US 12,340,349 B2
(45) Date of Patent: Jun. 24, 2025

(54) AI RESPONSE SYSTEM

(71) Applicant: Kazuhiko Matsutani, Tochigi (JP)

(72) Inventor: Kazuhiko Matsutani, Tochigi (JP)

( * ) Notice: Subject to any disclaimer, the term of this patent is extended or adjusted under 35 U.S.C. 154(b) by 69 days.

(21) Appl. No.: 17/781,592

(22) PCT Filed: Dec. 3, 2019

(86) PCT No.: PCT/JP2019/047105
§ 371 (c)(1),
(2) Date: Jun. 1, 2022

(87) PCT Pub. No.: WO2021/111507
PCT Pub. Date: Jun. 10, 2021

(65) Prior Publication Data
US 2023/0004937 A1    Jan. 5, 2023

(51) Int. Cl.
*G06Q 10/10*     (2023.01)
*G06N 20/00*    (2019.01)
*G06Q 10/0633*  (2023.01)

(52) U.S. Cl.
CPC .......... *G06Q 10/103* (2013.01); *G06N 20/00* (2019.01); *G06Q 10/0633* (2013.01)

(58) Field of Classification Search
CPC .. G06Q 10/103; G06Q 10/0633; G06Q 10/10; G06N 20/00; G06N 3/09
See application file for complete search history.

(56) References Cited

U.S. PATENT DOCUMENTS

| | | | | |
|---|---|---|---|---|
| 10,467,541 | B2* | 11/2019 | Podgorny | G06N 20/00 |
| 10,733,556 | B2* | 8/2020 | Bencke | G06Q 10/0633 |
| 2009/0119234 | A1* | 5/2009 | Pinckney | G06N 20/00 |
| | | | | 706/12 |
| 2009/0307159 | A1* | 12/2009 | Pinckney | G06N 20/00 |
| | | | | 706/11 |
| 2013/0179515 | A1* | 7/2013 | Chi | H04L 12/1818 |
| | | | | 709/206 |

(Continued)

FOREIGN PATENT DOCUMENTS

| | | |
|---|---|---|
| JP | 2006-209602 A | 8/2006 |
| JP | 2019-053629 A | 4/2019 |
| JP | 2019-117517 A | 7/2019 |
| JP | 2019-139574 A | 8/2019 |

OTHER PUBLICATIONS

"Artificial Intelligence for Citizen Services and Government" Hila Mehr Harvard Ash Center Technology & Democracy Fellow (Year: 2017).*

(Continued)

*Primary Examiner* — Alexandru Cirnu
(74) *Attorney, Agent, or Firm* — Paratus Law Group, PLLC

(57) ABSTRACT

An AI response system configured to generate a response to an inquiry. The AI response system includes a learning unit and a response generation unit. The learning unit is machine-learned by an inquiry, general information, a response and a satisfaction level index for a response. The response generation unit is configured, based on a learning result of the learning unit, to generate, in response to inquiries from a plurality of mobile terminals, responses to be transmitted to each of the mobile terminals.

14 Claims, 11 Drawing Sheets

(56) References Cited

U.S. PATENT DOCUMENTS

| | | | |
|---|---|---|---|
| 2014/0310614 A1* | 10/2014 | Jones | G06Q 10/107 |
| | | | 715/753 |
| 2018/0121766 A1* | 5/2018 | McCord | G06Q 10/06311 |
| 2020/0167675 A1* | 5/2020 | Baughman | G06N 5/04 |
| 2020/0272961 A1* | 8/2020 | Ozasa | G06Q 10/06 |
| 2021/0027485 A1* | 1/2021 | Zhang | G06T 7/11 |
| 2021/0049210 A1 | 2/2021 | Otsuka et al. | |

OTHER PUBLICATIONS

Inada et al., AI Interactive Web Agent "Desse", Document of 81st Special Interest Group on Spoken Language Understanding and Dialogue Processing (SIG-SLUD-B508), Oct. 5, 2017, pp. 51-54, The Japanese Society for Artificial Intelligence.

Kimura et al., Proposal of a debate type dialogue system on the topic of local issues included in the local assembly minutes, Proceedings of the 21st Annual Meeting of the Association for Natural Language Processing, Mar. 9, 2015, pp. 265-268.

Mar. 3, 2020, International Search Report issued for related PCT Application No. PCT/JP2019/047105.

Mar. 3, 2020, International Search Opinion issued for related PCT Application No. PCT/JP2019/047105.

Feb. 17, 2025, Chinese Office Action issued for related CN Application No. 201980102697.4.

Ueda et al., Chatbot masquerading as a speaker to promote bullying arbitration, IPSJ SIG Technical Report, Jul. 23, 2019, pp. 1-8, vol. 2019-HCI-184, No. 16.

\* cited by examiner

FIG.6

> I WANT TO DO THE JOB-1 WORK.
> I DON'T WANT TO TALK WITH Mr. B. — C201

> DETERMINATION FACTORS
> COMPANY INTERNAL PARAMETERS
>   WORK CONTENT AND ABILITY OF Mr. A
>   WORK CONTENT AND ABILITY OF Mr. B
>   WORKLOAD IN COMPANY
> CREATE PLAN
>   GENERATE PLURALITY OF COORDINATION CONTENTS
>   CALCULATE EFFECTIVENESS
>
> ⇩
>
> DETERMINE WORK CONTENTS OF A AND B
>
> — C202

> MR. A IS WONDERFUL FOR "... ... ...", :-)
> PLEASE DO THE JOB-1 WORK BY 10TH.
> PLEASE LEAVE THE WORK COORDINATION WITH Mr. B TO US. — C203

---

> MR. B, "..." IS WONDERFUL TODAY AS WELL.
>   LET'S DO THE JOB-2 WORK THIS WEEK. — C204

AI RESPONSE SYSTEM

CROSS REFERENCE TO PRIOR APPLICATION

This application is a National Stage Patent Application of PCT International Patent Application No. PCT/JP2019/047105 (filed on Dec. 3, 2019) under 35 U.S.C. § 371, which is hereby incorporated by reference in its entirety.

TECHNICAL FIELD

The present invention relates to an artificial intelligence response system (hereinafter, AI response system), and more particularly, to a technology of using Artificial Intelligence (hereinafter, AI) built by information from a plurality of information groups.

BACKGROUND ART

Conventionally, when a company grows, departments become crowded due to functional specialization. Then, in general, it takes time to transfer information, so there occurs an adverse effect that decision-making is delayed.

As a specific example of the adverse effect, there is a case where a section chief may have to make an explanation to a department manager, the department manager may have to coordinate between departments, and a subordinate may have to wait for a decision. In addition, there is a case where the number of meetings increases, no matter how many meeting rooms are, there is a shortage, many meetings increase the absence time of the boss, and the subordinate may not have the opportunity to report, contact, and consult. In addition, if the subordinate is under a boss who is not good at coordinating with other departments, the subordinate may be busy with coordination between departments and may not be able to perform his/her original work.

In addition, if the boss lacks the quality of a manager, the subordinate may be swayed by the boss's idea or may not receive appropriate work instructions. In this case, the subordinate may want to hesitate to report, contact, or consult with the boss, and may also have a dislike for the boss. The same can also be said for a case where the communication ability or the like of the subordinate is low, contrary to the boss.

Further, even if important items that need to be discussed quickly at the management layer are noticed, they may be delayed or concealed for the above reasons. For the right manager, problems and failure cases that occur in the company can be said to be a valuable opportunity to create improvement, but salaried workers (bosses and subordinates) who care about their positions may not report the same for the above reasons. It is a big loss for the company.

Furthermore, as a method of connecting the intentions and minds of the founders and retired meritors to the future, a company philosophy, education, and the like may be exemplified but these may not be enough.

In addition, it is assumed that smooth work execution is hindered due to language differences, time differences, and response delays due to remote locations, such as when the communication partner is a foreigner or overseas.

As a result, the efficiency at work is reduced and the attractiveness to work and organization is also reduced. In situations where communication with others is required, such as a relationship between a boss and a subordinate in a company, it is necessary to ask the other party's free time and mood because the other party is a person. At the same time, it is necessary to consider the other party's position, the other party's personality, language, time difference, whereabouts, and the like.

Therefore, there has been a need for a system that enables appropriate issuing of instructions to subordinates and communication with subordinates and improvement of relationships between subordinates, regardless of the quality of the boss and the scale of the organization.

In addition, in private, there may be a case where there is no suitable counselor, and therefore, it is not possible to make consultations or to ask questions. Therefore, there has been a need for a system that enables appropriate consultations and questions, regardless of the environment of the questioner.

In the related art, various technologies have been proposed for such problems. For example, suggested is a system in which various information, proposals, and improvement proposals obtained by all employees are utilized in collective administrative management (refer to PTL 1). However, there is no description about communication between employees and managers, and the problem of the present invention has not been solved.

CITATION LIST

Patent Literature

PTL 1: JP2006-209602A

SUMMARY

Technical Problem

In view of the problems that it is not possible to appropriately perform issuing of instructions to subordinates, communication with subordinates and improvement of relationships between subordinates, the present invention is to use AI and big data and to execute work performed by an existing management layer (human). In other words, the problems are solved by a system that responds to an inquiry from a subordinate, based on a learning result of a machine-learned learning unit.

Solution to Problem

An AI response system according to the present invention is a response system configured to generate a response to an inquiry, and includes a learning unit machine-learned by an inquiry, general information, a response and a satisfaction level index for a response, and a response generation unit configured, based on a learning result of the learning unit, to generate, in response to inquiries from a plurality of mobile terminals, responses to be transmitted to each of the mobile terminals.

In addition, the present invention performs the machine learning by company internal information, in addition to the general information.

Further, the inquiry of the present invention includes any one of at least a report, a contact, a consultation, an opinion, a hope, a question, a worry, a dream, likes and dislikes, and a self-introduction.

In addition, the company internal information of the present invention includes any one of at least a company philosophy, a company culture, a company regulation, a policy, a history, a contract, a specification, a procedure manual, a story of a successive in-house successful person, customer information, management information, a business trip report of a business traveler, minutes of internal and external meetings, and employee competence information (qualification, experience, performance record).

In addition, the general information of the present invention includes any one of at least a biography, words of successful persons, questions and answers, a self-development book, a specialized hook, gelotology, humorology, a current-affairs material, a national language, arithmetic, science, society, English, laws and regulations, ministerial ordinances, standards such as ISO and JIS, and intellectual property information (patent, trademark, copyright and the like).

Further, the response of the present invention includes any one of at least an instruction, an advice, a teaching, a coaching, a complimenting, a scolding, a motivating, a human ability enhancement, a social human ability enhancement, an office contact and a document preparation support.

Further, a manager or a user of the present invention can select a part of the general information.

Further, an appearance of a respondent and an expression of the response of the present invention can be selected from a plurality of characters.

Further, the response generation unit of the present invention is configured to generate the response, according to a weighting for each information.

Further, the response generation unit of the present invention is configured to generate the response in a form of a conversation among a plurality of persons.

In addition, an interpersonal coordination unit configured, when a content of the inquiry of the present invention relates to an interpersonal relationship, to coordinate an interpersonal relationship and a work content is provided, and a response to coordinate an interpersonal relationship is notified to an inquirer and a person involved.

Further, the present invention has an importance level learning unit machine-learned by the inquiry, the company internal information, the general information, and an importance level index for an inquiry, and based on a learning result of the importance level learning unit, in response to inquiries from the plurality of mobile terminals, selects an inquiry with high importance level and notifies the same to a manager.

Advantageous Effects

According to the AI response system of the present invention, it is possible to always give an appropriate response to an inquiry, so that it is possible to improve the user's security and satisfaction level.

In addition, according to the AI response system of the present invention, by using it as a work-related system, it is possible to contribute to optimization and efficiency of work, and to develop human resources of users by employee education just by using the system.

BRIEF DESCRIPTION OF DRAWINGS

FIG. 6 is a display diagram of inquiries and responses of the interpersonal coordination system of the embodiment of the AI response system according to the present invention.

DESCRIPTION OF EMBODIMENTS

The most distinctive feature of an AI response system according to the present invention is that it is possible to obtain an appropriate response to an inquiry, regardless of the environment or the boss.

Hereinafter, embodiments of the AI response system according to the present invention will be described with reference to the drawings.

Note that, the overall configuration of the AI response system shown in the present embodiment and the configuration of each unit are not limited to embodiments described below, and can be appropriately changed within the scope of the technical spirit of the present invention, i.e., within the range of configurations, use modes and the like that can be exhibit the same operational effects.

Embodiment 1

The present invention is described with reference to FIGS. 1 to 8.

Figure 1:
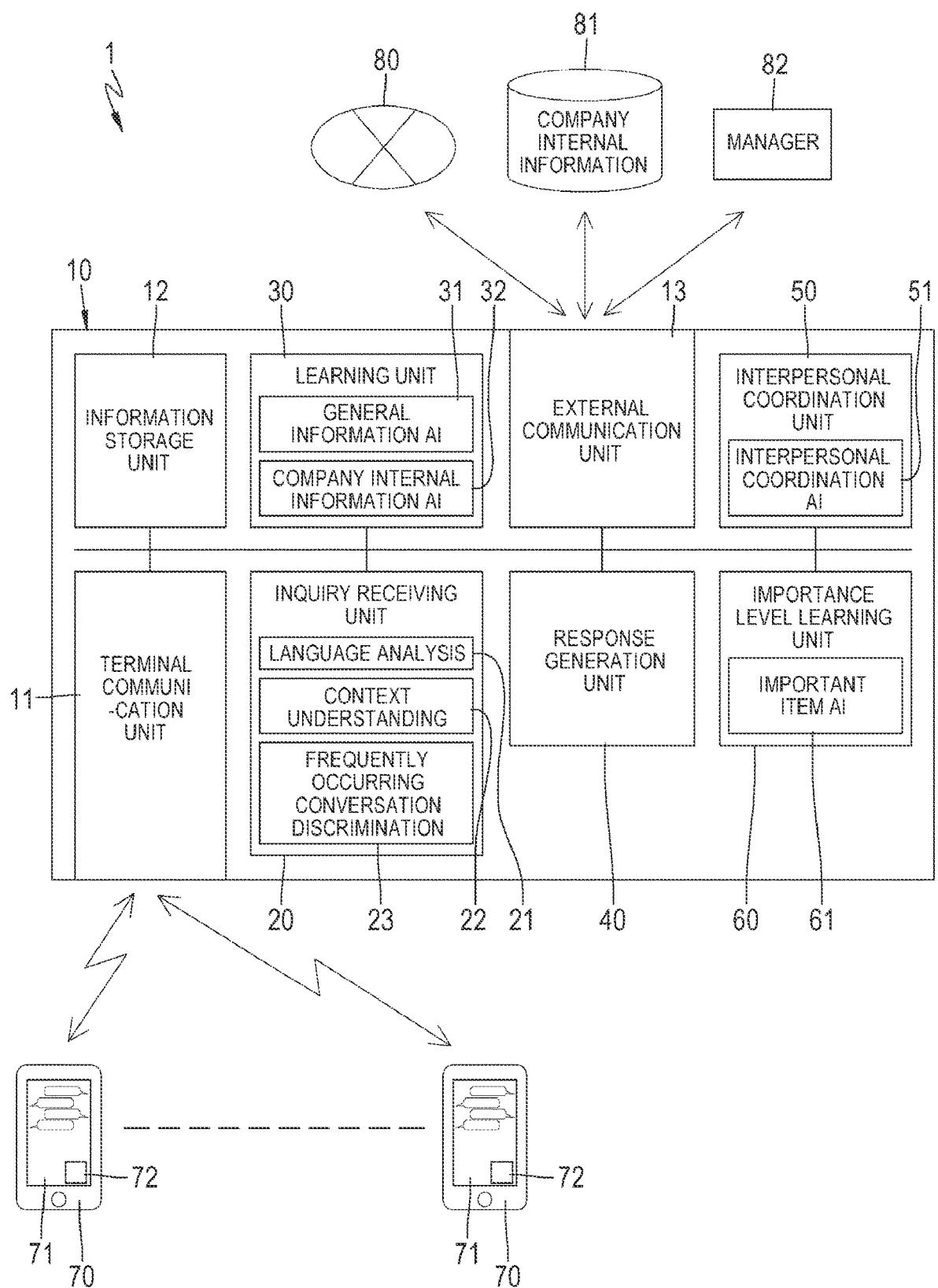
FIG. 1 is a system diagram of an embodiment of an AI response system according to the present invention.
Figure 2A:
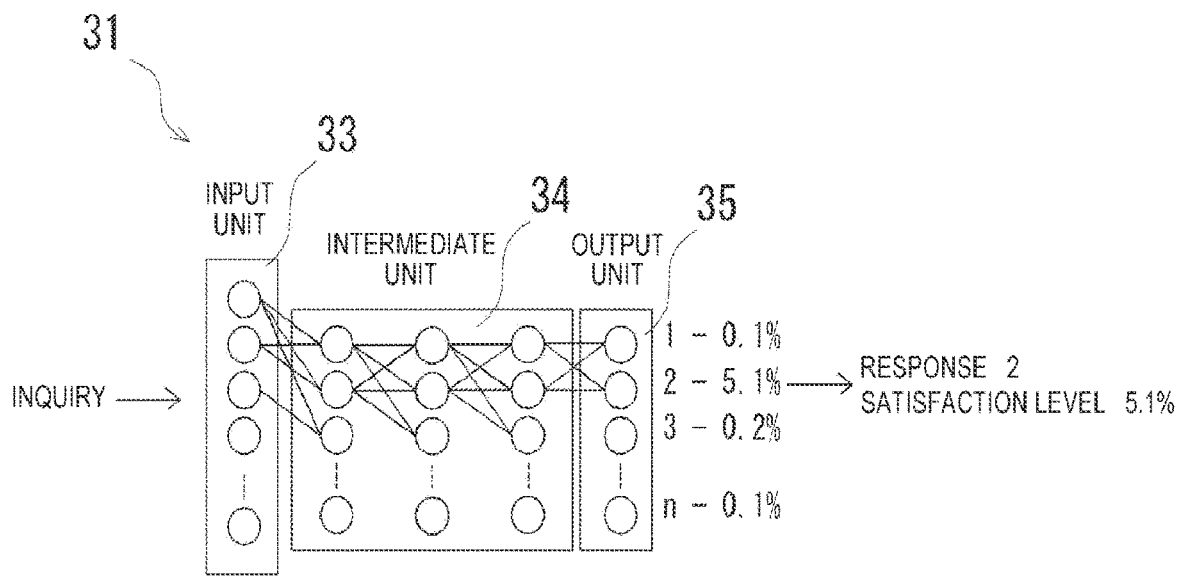
FIGS. 2A and 2B are schematic diagrams of a learning process of the embodiment of the AI response system according to the present invention.
Figure 2B:
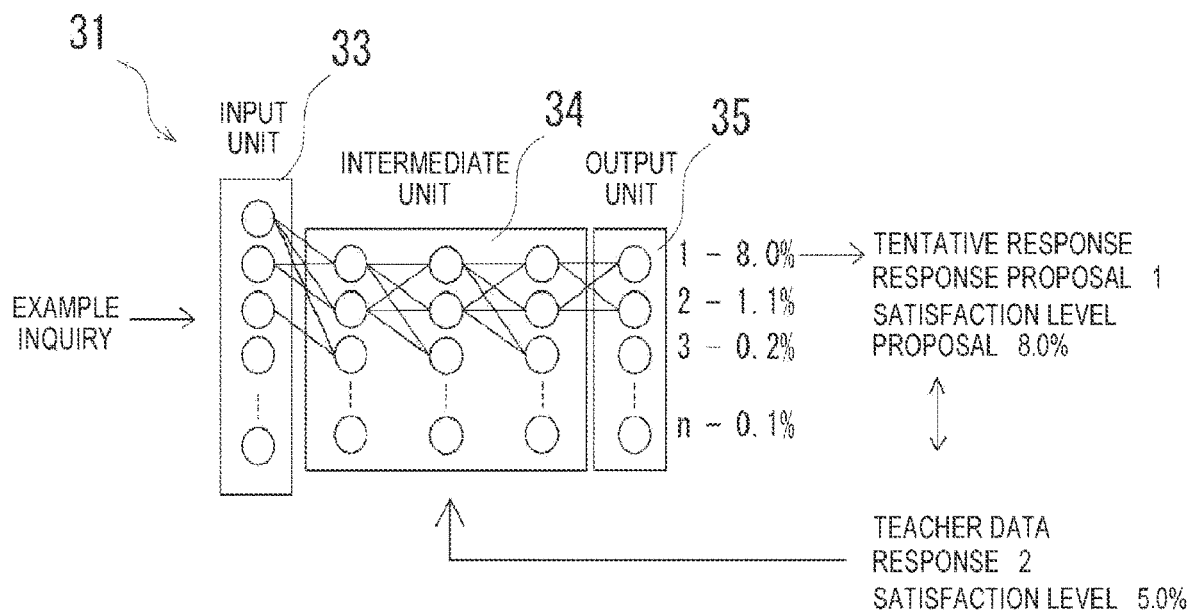
Figure 3:
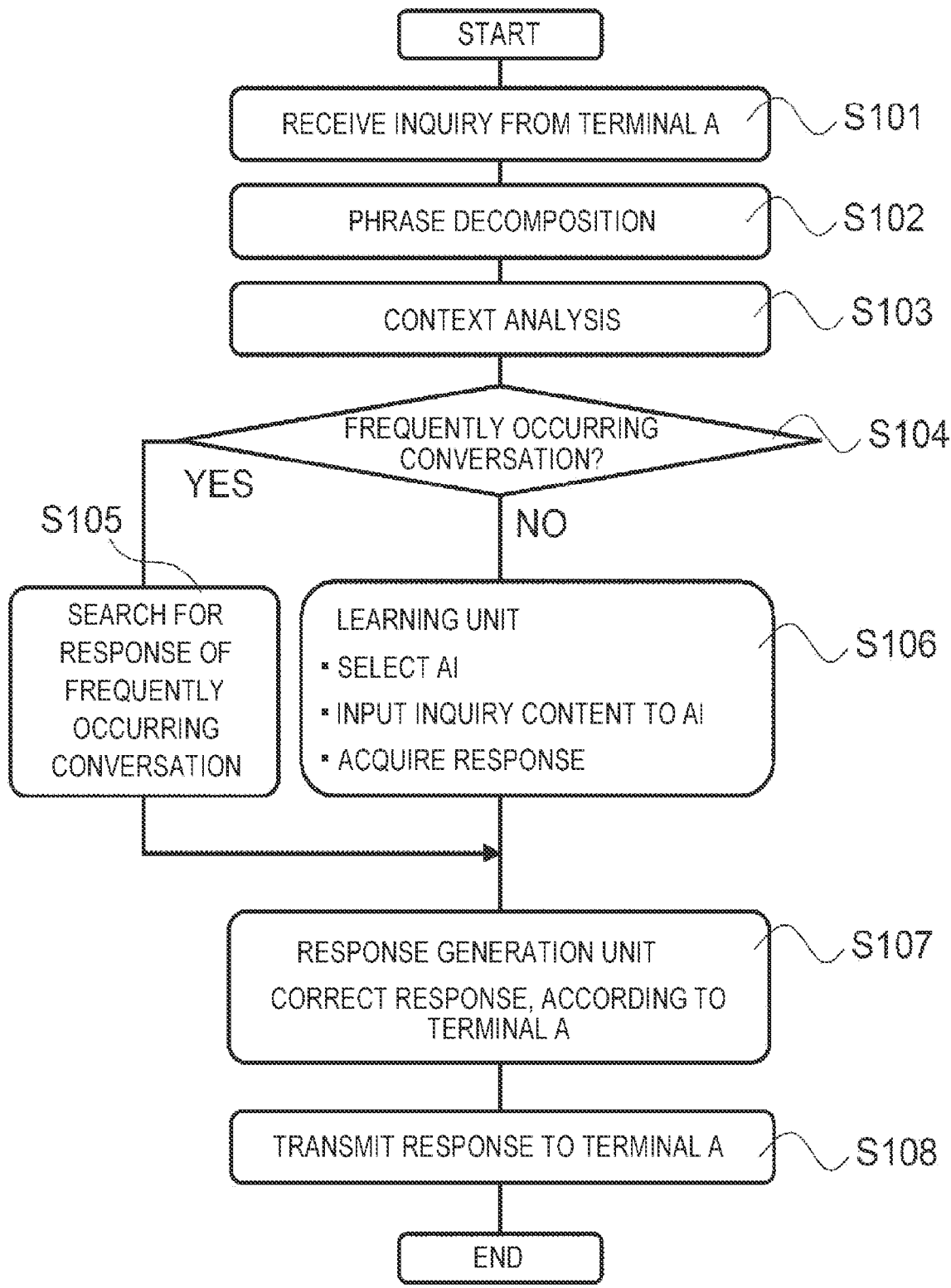
FIG. 3 is a flowchart of a response system of the embodiment of the AI response system according to the present invention.
Figure 4A:
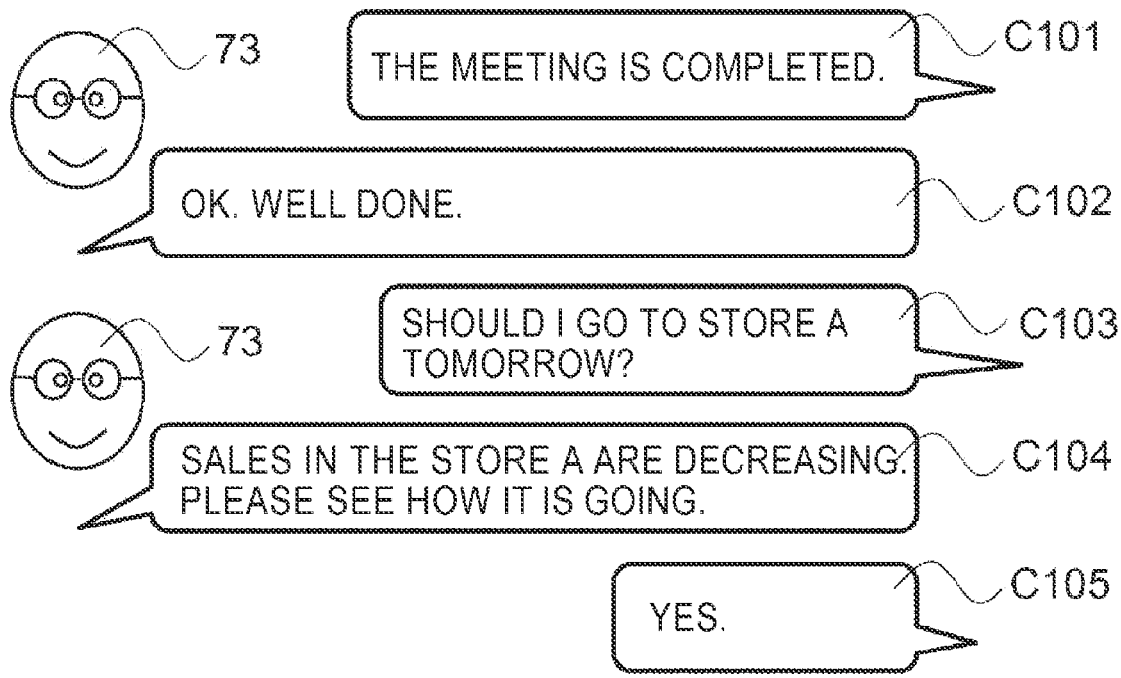
FIGS. 4A and 4B are display diagrams of inquiries and responses of the response system of the embodiment of the AI response system according to the present invention.
Figure 4B:
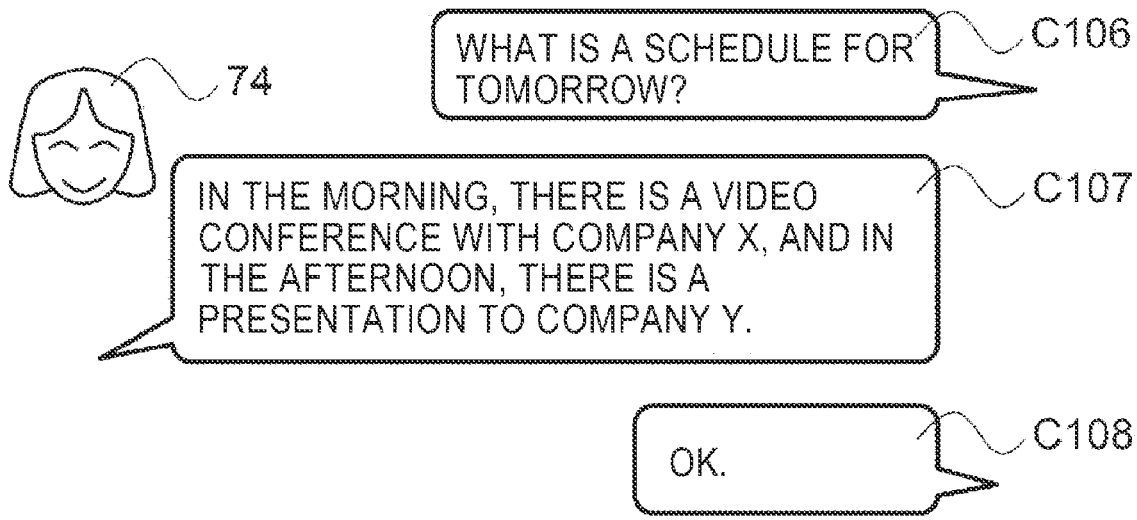
Figure 5:
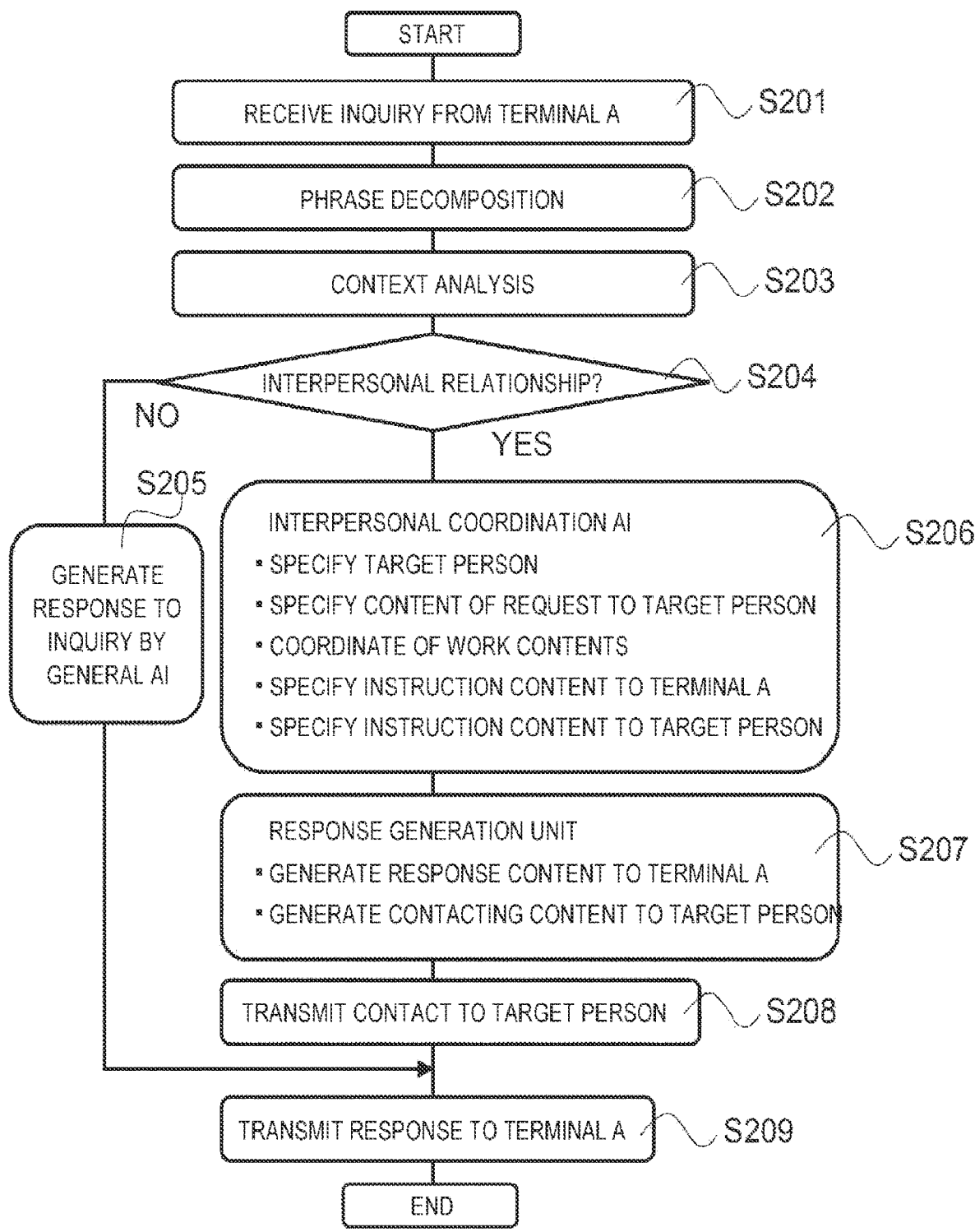
FIG. 5 is a flowchart of an interpersonal coordination system of the embodiment of the AI response system according to the present invention.
Figure 7:
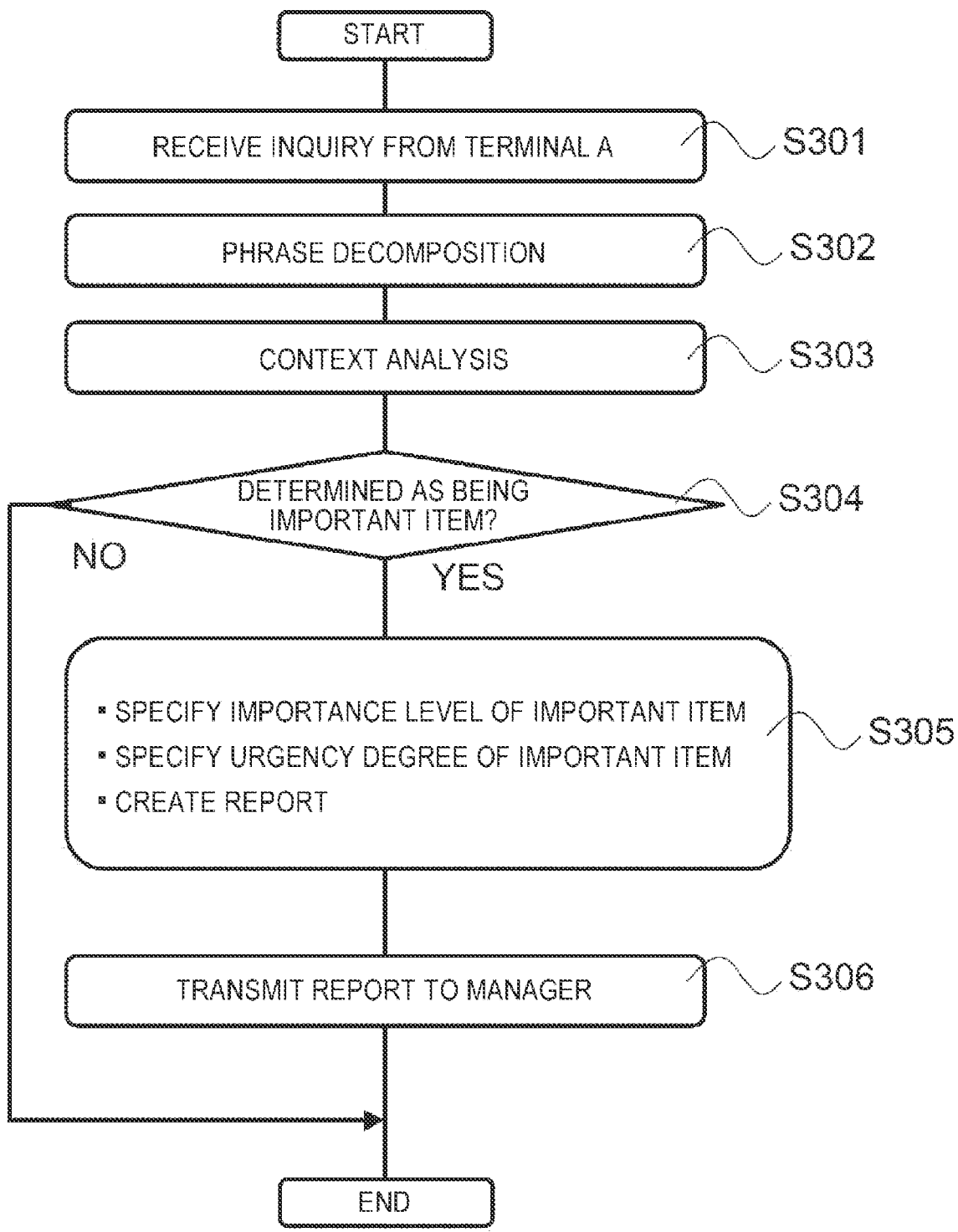
FIG. 7 is a flowchart of an important item notification system of the embodiment of the AI response system according to the present invention.
Figure 8:
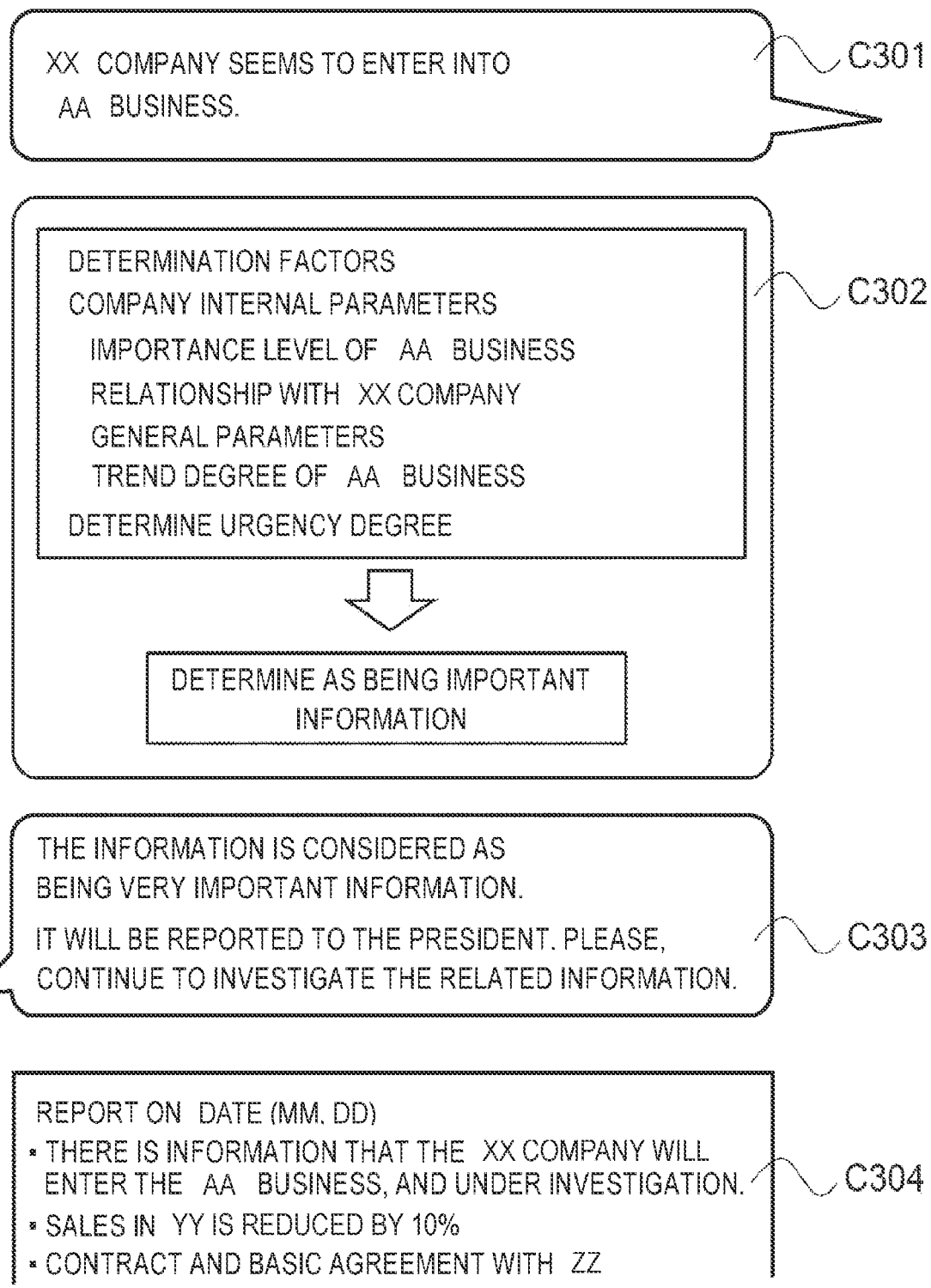
FIG. 8 is a display diagram of inquiries and responses of the interpersonal coordination system of the embodiment of the AI response system according to the present invention.

FIG. 1 is a system diagram of an embodiment of an AI response system according to the present invention. FIGS. 2A and 2B are schematic diagrams of a learning process of the embodiment of the AI response system according to the present invention. FIG. 3 is a flowchart of a response system of the embodiment of the AI response system according to the present invention. FIGS. 4A and 4B are display diagrams of inquiries and responses of the response system of the embodiment of the AI response system according to the present invention. FIG. 5 is a flowchart of an interpersonal coordination system of the embodiment of the AI response system according to the present invention. FIG. 6 is a display diagram of inquiries and responses of the interpersonal coordination system of the embodiment of the AI response system according to the present invention. FIG. 7 is a flowchart of an important item notification system of the embodiment of the AI response system according to the present invention. FIG. 8 is a display diagram of inquiries and responses of the interpersonal coordination system of the embodiment of the AI response system according to the present invention.

An AI response system 1 is a system configured, for example, to respond to an inquiry from a terminal by using AI. For companies, it can be used as a system configured to respond to an inquiry from an employee. For the general public, it can be used as a system configured to respond to a consultation with a friend-like sense.

Any system includes a response system configured to respond to an inquiry by using AI, and an interpersonal coordination system configured to coordinate an interpersonal relationship, in response to an inquiry. For companies, an important item notification system configured to notify an inquiry to a manager according to an importance level of the inquiry is also added.

The three systems are configured to operate as appropriate, according to a content of the inquiry.

The inquiry is a report, a contact, a consultation, an opinion, a hope, a question, a worry, a dream, likes and dislikes, a self-introduction, and the like. If it is a system in a company, reporting and contacting are main contents.

An inquirer proceeds with work by obtaining a response to the inquiry, such as an instruction, an advice, a teaching, a coaching, a complimenting, a scolding, an office contact and a document preparation support. In addition, the inquirer enhances motivation by obtaining a response to the consultation, which induces a motivation and enhances a human ability and a social human ability.

Inquiries from employees and the general public include hopes, questions, worries, dreams, likes and dislikes, self-introductions, and the like. The inquiries are cases that the inquirer wants someone to hear, or someone to give an advice. The inquirer is satisfied with the content of an advice, a teaching, a coaching, a complimenting, a scolding, a motivating, a human ability enhancement, or a social human ability enhancement, as the response.

In the meantime, when making an inquiry, it is possible to be anonymous at the time of notification from the AI to a manager 82, depending on the content, and in such a case, it can be assumed that the correct information is collected by the manager 82. However, it is preferable to keep the information about the inquirer as a record in the AI even when it is anonymous to the manager 82, and even if it is anonymous, it is possible to record achievements and the like of the inquirer's discovery and report in the AI. Note that, an aspect is also possible in which the inquirer is allowed to select whether or not to be anonymous when making an inquiry.

The response system is configured to respond to an inquiry such as a contact, a consultation, a question and the like by general information AI and the like. AI has been learned in advance by deep learning or the like based on relevant information. The inquirer can immediately obtain an appropriate response within a scope of AI learning.

The interpersonal coordination system is configured to operate when the inquirer consults about a human relationship. In addition to advising on interpersonal worries and troubles from the inquirer, when the interpersonal coordination system can access a target person, the system tries interpersonal improvement by contacting and giving advice to the target person.

If it is a work-related system, coordination will be made, including review of a work for which the inquirer is responsible.

The important item notification system is configured to determine by AI whether the information, the contact, and the like from the inquirer contains a content that is considered important for the company, and when it is determined as being important, the important item notification system notifies the content to the manager.

The AI response system 1 includes an AI response unit 10 and a plurality of mobile terminals 70. In addition, the AI response unit 10 is connected to the external Internet 80, and is communicated with company internal information 81 and a manager 82. The AI response unit 10 and the mobile terminals 70 are connected by wireless communication, and are connected via a dedicated communication network or the Internet. Note that, the AI response system 1 can, of course, operate in conjunction with a desktop PC.

The AI response unit 10 is a main part of the system, and includes a terminal communication unit 11, an information storage unit 12, an external communication unit 13, an inquiry receiving unit 20, a learning unit 30, a response generation unit 40, and an importance level learning unit 60.

The AI response unit 10 is configured to receive inquiries from the plurality of mobile terminals 70, to generate responses by using AI, and to transmit the responses to the mobile terminals 70. In addition, information is acquired from the Internet 80 and the company internal information 81 at any time. In addition, a notification is issued to the manager 82 as appropriate.

The terminal communication unit 11 is a part configured to perform transmission/reception with respect to the mobile terminals 70. Communication is performed with the mobile terminals 70 by using wireless communication. The wireless may be a system-dedicated line or usual mobile communication. The communication may be an email form or a chat form. Further, depending on the content of the inquiry, the communication may include audio such as telephone or the like and video such as videophone or the like.

The information storage unit 12 is a part configured to store information for AI. The information used in AI learning, such as general information and company internal information, or information newly acquired from the outside is stored.

The general information is generally known information that may be used for responses, such as a biography, words of successful persons, a questions and answers (so-called wisdom bag), a self-development book, a specialized book, gelotology, humorology, a current-affairs material, a national language, arithmetic, science, society, English, laws and regulations, ministerial ordinances, standards such as ISO and JIS, and intellectual property information (patent, trademark, copyright and the like).

The reason to use a biography and words of successful persons is that they contain highly effective contents as responses of advice and encouragement to the inquirer. The reason to use a questions and answers (wisdom bag), a self-development book and a specialized book is that, when an inquiry is about a technical check or a check of a direction of technology improvement, they contain contents that can be advised. The reason to use gelotology and humorology is that they are effective in including an element that relaxes an inquirer. The reason to use a current-affairs material is that it is effective in making a response added with a change in the current of times. A national language, arithmetic, science, society and English are used because they are necessary in generating a response, based on basic knowledges. Laws and regulations, ministerial ordinances, standards such as ISO and JIS and intellectual property information are used because they are necessary in generating a response, based on deeper knowledges.

Note that, if all information can be randomly obtained as the general information, a possibility is assumed in which false information and even information derived from thoughts and feelings that deviate from common sense may be obtained, and as a result, common-sense determination may not be made. In addition, since it is assumed that the required information may differ depending on the use aspect and use situation of the present system, the field, type, range, and amount of required general information are preferably determined as appropriate in advance or later by a user, a manager and the like. By adopting such an aspect, it is possible to guarantee exclusion of information harmful to the determination/response generation in AI, and it is also possible to give the AI a specialty and/or a character desired by the user or the manager.

The company internal information is information of high importance level in a company, such as a company philosophy, a company culture, a company regulation, a policy, a history, a contract, a specification, a procedure manual, a story of a successive in-house successful person, customer information, management information, a business trip report of a business traveler, minutes of internal and external meetings, and employee competence information such as qualification, experience, performance record, and etc. The company philosophy is the basis for creating a company's style, in many cases. The story of a successive in-house successful person may be helpful in determining the direction of work. The customer information and the management information are information directly related to work contents of employees. The business trip report of a business traveler and the minutes of internal and external meetings are accumulated as company internal information over time. The employee competence information may be used as a reference when giving responses (advices) tailored to individual's individuality and characteristics, forming a well-balanced team, and performing personnel affairs in the right place.

Note that, in addition to being used within one company, the present invention can be assumed to be used among a plurality of companies such as joint companies and group companies. Furthermore, the present invention is assumed to be used not only in companies, but also in all situations where communication with people is required, such as schools, government offices, club activities, political environments and the like. Therefore, the wording "company-internal" and "company" are not limitedly interpreted according to the wording, but are differently read and understood as appropriate depending on the use situation.

In addition, as an example used during machine learning, inquiries, responses, and response satisfaction levels are stored. As an example, inquiries, responses and response satisfaction level form a set. When making an inquiry, a response and a response satisfaction level prepared as a model answer are given.

When AI performs machine learning such as deep learning, it compares a response proposal and a tentative response satisfaction level proposal output during the machine learning process with a response and a response satisfaction level prepared as a model answer, and feeds back the same to the machine learning process to enhance learning accuracy.

The external communication unit 13 is a part configured to acquire information from an outside and to transmit a report to the manager 82. When there is new information on the Internet 80 or the company internal information 81, the external communication unit takes and stores the information in the information storage unit 12. In addition, when an inquiry includes important information, the external communication unit transmits a report thereof toward the manager 82, The inquiry receiving unit 20 is a part configured to perform preprocessing on the inquiry received by the terminal communication unit 11 before transmitting the inquiry to the learning unit 30.

The inquiry receiving unit 20 includes a language analysis 21, a context understanding 22, and a frequently occurring conversation discrimination 23. The language analysis 21 is configured to analyze an inquiry in a sentence unit. The language analysis mainly analyzes a phrase and a part of speech. By the language analysis 21, a content in a sentence unit is fixed.

The context understanding 22 is a part configured to check a relationship between preceding and following sentences. This analysis fixes a nuance of each sentence.

The frequently occurring conversation discrimination 23 is a part configured to determine whether to input a content of the inquiry to the AI. For inquiries that simply refer to data, such as "What's the weather tomorrow?" and "What is a schedule for tomorrow?", response processing is performed without passing through the AI. For the other inquiries, contents of the inquiries are transmitted to the AI.

The learning unit 30 is a main part of the present invention. The learning unit is a part configured to output a response to an inquiry. The learning unit 30 has AI for each field, e.g. general information AI 31 and company internal information AI 32 etc., are provided. The general information AI 31 is configured to output a response learned from the general information, and the company internal information AI 32 is configured to output a response learned from the company internal information. Depending on a method of response, responses from all AIs may be used, or responses from only some AIs may be used.

There are various methods for AI, for example, a method using a neural network. By decomposing the content of the input inquiry by a predetermined method and passing through a mesh-like route having many branches and weightings, a content close to a content to be responded, which is obtained by learning by examples, is output. An example of the machine learning will be described separately.

The response generation unit 40 is a part configured to arrange responses output by the learning unit 30 for each inquirer. An inquirer may want a soft response, or may want a straightforward response. The response generation unit is a part configured to coordinate an overall format of the response.

For example, in a case where an output from the learning unit 30 is "Be confident without worrying about the surroundings.", when the inquirer wants a soft response, the response generation unit coordinates the output into a change that emphasizes the concern for the other party, such as "It may be difficult to change suddenly, but I think that the situation will improve if you are confident without worrying about the surroundings."

When the inquirer wants a straightforward response, the response generation unit coordinates the output into a clear expression such as "Be confident without worrying about the surroundings! And the situation will improve."

In addition, the response generation unit adds a character to the response, according to an inquirer's setting. As used herein, the character includes an image, a voice, a personality, and the like. When the inquirer wants a respondent like an elderly boss, the response generation unit adds such a character. When the inquirer wants a response from a woman, the response generation unit adds a female character.

The interpersonal coordination unit 50 is used when the content of the inquiry relates to an interpersonal relationship. The interpersonal coordination unit has an interpersonal coordination AI 51. The interpersonal coordination AI 51 is an AI that has learned information for coordinating relationships among a plurality of persons. The content of the inquiry is mainly such that it is desired to cut or reduce a relationship with a target person, to improve or recover the relationship with the target person, and the like.

AI learns various cases about relationships between a person and the target person and persons around the person, and generates an optimal response.

When the content from the inquirer contains important information, the importance level learning unit 60 discriminates and reports the same to the manager 82. The importance level learning unit 60 has an important item AI 61. In a case where an inquirer is an employee of a company, when the content of the inquiry is determined to influence the management of the company, the situation of the department or the like, the important item AI 61 reports the information to the manager 82 on a regular or irregular basis. The importance level is determined by the important item AI 61. The important item AI 61 is configured to perform machine learning, based on examples and responses of business and organizational management inquiries, and to determine the importance level.

The mobile terminal 70 is carried by each person in charge or an individual, and is a concept including a wearable terminal, a smart speaker, and an internet-of-things (so-called IOT) device. Note that, as described above, since the present system can operate in conjunction with a desktop PC, the present system is a concept including the desktop PC in a broader sense. The mobile terminal has a display unit 71 configured to display a content of an inquiry and a response, and includes a built-in application 72 configured to communicate with the AI response unit 10, depending on the system. The number of the mobile terminals 70 can be increased as many as possible by increasing a processing capacity of the AI response unit 10. For this reason, all employees of the company can have the mobile terminals. Then, all the information from all the employees is transmitted to the AI response unit 10, and therefore, the real-time property of the information is also improved.

The Internet 80 and the company internal information 81 are information providing parts outside the system. By connecting all the time or periodically, the corresponding contents of the AI response unit 10 can be sequentially updated.

The manager 82 is an operation manager of the AI response unit 10. In a case of a company, all employees may have the mobile terminals 70, and the president may perform management, as the manager 82. By receiving a report from the AI response unit 10, the manager 82 can efficiently perceive all the employees in a short time.

Description of Machine Learning

The operation of AI and the contents of machine learning of AI are described with reference to FIGS. 2A and 2B by taking the general information AI 31 as an example.

FIG. 2A is a schematic view showing an example of AI. The AI includes an input unit 33, an intermediate unit 34, and an output unit 35. The input unit 33 is an input to the AI, and inquiry data is appropriately decomposed and input thereto. The intermediate unit 34 is a neural network learned by deep learning, and performs processing corresponding to the inquiry data in multiple stages. Many neurons are connected in multiple layers. Learning is performed by changing weightings among the respective neurons, and the like. From the learned content, optimal data and a data satisfaction level (satisfaction level estimated to be felt by the inquirer) are output to the output unit 35. To be precise, an output with the highest satisfaction level among the outputs is adopted as the output.

FIG. 2B is a schematic view showing an example of AI learning. The AI includes an input unit 33, an intermediate unit 34, and an output unit 35. The data consists of many examples. The example consists of an inquiry, a group of information, a model response and a model response satisfaction level. The model response and the model response satisfaction level are also referred to as teacher data.

In the learning method, the inquiry of each example is appropriately decomposed and input to the input unit 33, and a tentative response and a tentative response satisfaction level are output from the output unit 35. When the tentative response and the tentative response satisfaction level are different from the model response and the model response satisfaction level, a difference between the tentative response and tentative response satisfaction level and the model response and model response satisfaction level is fed back to the neural network of the intermediate unit 34. By repeating this processing, the learning accuracy is improved.

As additional learning, additional learning can be performed at any time by acquiring a satisfaction level of the inquirer about the response to the inquiry while the system is operating.

Description of System that Performs Action Such as Response

An operation of the response system that responses to an inquiry is described with reference to FIGS. 3 to 4B. FIG. 3 is a flowchart from an inquiry to a response, and FIGS. 4A and 4B show conversations displayed on the display unit 71 of the mobile terminal 70.

An inquirer inputs an inquiry to the mobile terminal 70. For example, the inquirer inputs "The meeting is completed.", like C101. The inquiry is transmitted from the mobile terminal 70 to the AI response unit 10, and the terminal communication unit 11 of the AI response unit 10 receives the content (S101). The inquiry receiving unit 20 of the AI response unit 10 analyzes the content of the inquiry. By the language analysis 21, a phrase decomposition is performed. "The meeting is complete." is decomposed into "meeting" and "completed". Next, a context analysis is performed (S103).

Since this case is a beginning of the conversation, no contextual correction is made. The frequently occurring conversation discrimination 23 discriminates whether the conversation is a frequently occurring conversation (S104). Since this case is a mere report, it is determined that the conversation is a frequently occurring conversation, and a corresponding response is extracted (S105). The response is "OK." The response is sent to the importance level learning unit 60 (S109). By the setting of the terminal, the response is corrected. For example, the response is corrected depending on whether the inquirer wants a soft response or a straightforward response. If it is soft, the response is "It's OK. Well done.", for example. If it is straightforward, the response is "OK."

In addition to correcting the response, a character of the respondent can also be added. For example, if the inquirer desires an elderly boss as a respondent, image data of such a character A73 is added. If the inquirer desires a female boss as a respondent, image data of such a character B74 is added. Note that, as used herein, the character includes a voice, a personality and the like, in addition to the image.

In this way, by allowing the inquirer to select a favorite character, the inquirer can have a sense of intimacy with the respondent.

The response is transmitted to the mobile terminal 70 through the terminal communication unit 11 (S108). On the display unit 71 of the mobile terminal 70, the response content "It's OK. Well done." (C102) and the character A73 are displayed.

Next, a case where there is an inquiry "Should I go around the store A tomorrow?" (C103) from the inquirer is described. The inquiry content is received by the terminal communication unit 11 (S101), decomposed into phrases (S102), and contextually analyzed (S103). In the discrimination by the frequently occurring conversation discrimination 23, it is determined that a response according to the company internal information AI 32 is necessary (S104), and the inquiry content is sent to the learning unit 30.

The learning unit 30 selects the company internal information AI 32, as the AI, inputs the inquiry content to the AI, and acquires a response as an output of the AI (S106). The response is, for example, "Sales in the store A decrease. Check required." The response generation unit 40 corrects the response according to the setting of the terminal into "Sales in the store A are decreasing. Please see how it is going.", for example (S107).

The corrected response is transmitted to the mobile terminal 70 through the terminal communication unit 11 (S108). The response (C104) and the character A73 are displayed on the display unit 71 of the mobile terminal 70.

The frequently occurring conversation includes a mere report, a question about mere information, and the like. The mere information is information that can be found by searching on the Internet, such as weather and traffic jam information. Information that can be easily understood by accessing related information is also included.

In a case where the inquiry content is "What is a schedule for tomorrow?" (C106), it is information that can be checked by accessing the company, and therefore, is determined as being a frequently occurring conversation. As a response, the response content "In the morning, there is a video conference with Company X, and in the afternoon, there is a presentation to Company Y." (C107) and the character B74 are displayed on the display unit 71.

In this way, according to the present invention, it is possible to give an accurate response to an inquiry by using a lot of information and machine learning.

Description of Interpersonal Coordination System

An operation of the interpersonal coordination system is described with reference to FIGS. 5 and 6.

Inquiries include inquiries and consultations regarding interpersonal relationships, such as not wanting to meet Mr. XX who is a certain target person or wanting to meet Mr. YY who is a certain target person. A response and an advice can be given toward one inquirer who has input an inquiry and a consultation. However, in a case where a target person is a user of the same system, a notification and an advice can also be given toward the target person. In this case, even when the target person has not inquired and consulted regarding the interpersonal relationship, a notification and an advice may be given from the system to the target person. In addition, a notification and an advice may be communicated to the target person with being added to a response that has been made when the target person has input another inquiry to the system.

Improving an interpersonal relationship is extremely beneficial because it improves work efficiency, as a company, and allows the general public to lead a more comfortable life. Also, in general, in many cases, the interpersonal relationship is a sensitive problem, and the problem is aggravated if a third party intervenes unnecessarily. A contact from the AI system or the like can enable the problem to be dealt with without prejudice.

The processing is described which is executed when the inquiry "I want to do the job-1 work. I don't want to talk with Mr. B." (C201) is transmitted from the inquirer A. The inquiry is received (S201), phrase decomposition is performed (S202), context analysis is performed (S203), and it is determined in the frequently occurring conversation discrimination 23 whether the interpersonal relationship is included (S204). When the interpersonal relationship is not included, a response is acquired by the general AI (S205). When the interpersonal relationship is included, processing is performed by the interpersonal AI (S206).

The interpersonal coordination AI 51 of the interpersonal coordination unit 50 specifies a target person. The target person is specified and a characteristic of the target person is checked. A content of the request to the target person is specified. If it is a work, the content is such as not wanting to join the same team. If it is a company, the work content is coordinated (S206).

In the coordination of the work content, the work contents, abilities, and achievements of A and B are checked as company internal parameters. Next, the workload of each group in the company is checked. Next, a plan for interpersonal coordination is accordingly created. For this inquiry, a plan to separate the work groups of A and B is created (C202).

A response corresponding to the plan is created.

A plurality of plans may be created, the effectiveness may be calculated and a plan with the highest effectiveness may be selected. By doing so, the accuracy of coordination is also improved.

The created response is corrected according to the setting of the terminal A and the selling of the terminal of the target person (B). For example, in a case where the response to A is "Do the JOB-1 work until 10th. Mr. B will be excluded." and the response to B is "Do the JOB-2 work.", the response to A is corrected to "Mr. A is wonderful for " . . . ":-). Please do the JOB-1 work by 10th. Please leave the work coordination with Mr. B to us." (C203).

The response to B is corrected to "Mr. B, " . . . " is wonderful today as well. Let's do the JOB-2 work this week." (C204).

The response is transmitted to the target person (B) (S208). The response "Mr. B, " . . . " is wonderful today as well. Let's do the JOB-2 work this week." is displayed as a soft talking style on the terminal of B, which reduces a sense of discomfort.

The response is transmitted to the terminal A (S209). The response "Mr. A is wonderful for " . . . ":-). Please do the JOB-1 work by 10th. Please leave the work coordination with Mr. B to us." on the terminal of A, thereby notifying that coordination will be made.

In this way, even when the inquiry includes the content relating to the interpersonal relationship, a contact is performed even for the target person, so that coordination can be made without the intervention of a person.

Description of Important Item Notification System

An operation of the important item notification system is described with reference to FIGS. 7 and 8.

In a case of a system for companies, it is convenient to enable a content of high importance level of many inquiries and reports made by the system to be reported to the manager 82.

Therefore, a system for discriminating and reporting an important item in parallel with the system for responding to an inquiry is described.

For example, if information such as "XX company seems to enter into an AA business" (C301) is transmitted from the inquirer, the AI response unit 10 receives the inquiry (S201), performs phase decomposition (S302), and performs context analysis (S303). The data is transmitted to the importance level learning unit 60 in parallel with a route to the AI or the like. The important item AI 61 of the importance level learning unit 60 checks an importance level of the AA business and a relationship with the XX company from the company internal parameters, as determination factors. In addition, the important item AI checks, as a general parameter, a trend degree of the AA business. Based on this content, the important item AI 61 discriminates whether it is determined as being an important item (S304, C302). When it is determined as being an important item, the important item AI specifies an item and an importance level of the important item. In addition, the important item AI sets a time axis as an urgency degree of important item. The important item AI specifies whether immediate determination is needed, this week or this year.

In addition, a report (C304) to the manager 82 is created (S305). Then, the report is transmitted to the manager 82 (S306).

The inquirer is informed that the information will be reported as important information (C303). The reason is that as the inquirer, it may be unpleasant to be reported without permission, and if it is important information, it will motivate the inquirer to investigate more detailed information.

In this way, since a smooth response to the inquirer is performed and important information for a company can be extracted without leak, the company can take a quick measure, which is preferable.

Embodiment 2

Description of Embodiment of Selecting Response from Plurality of AIs

Figure 9:
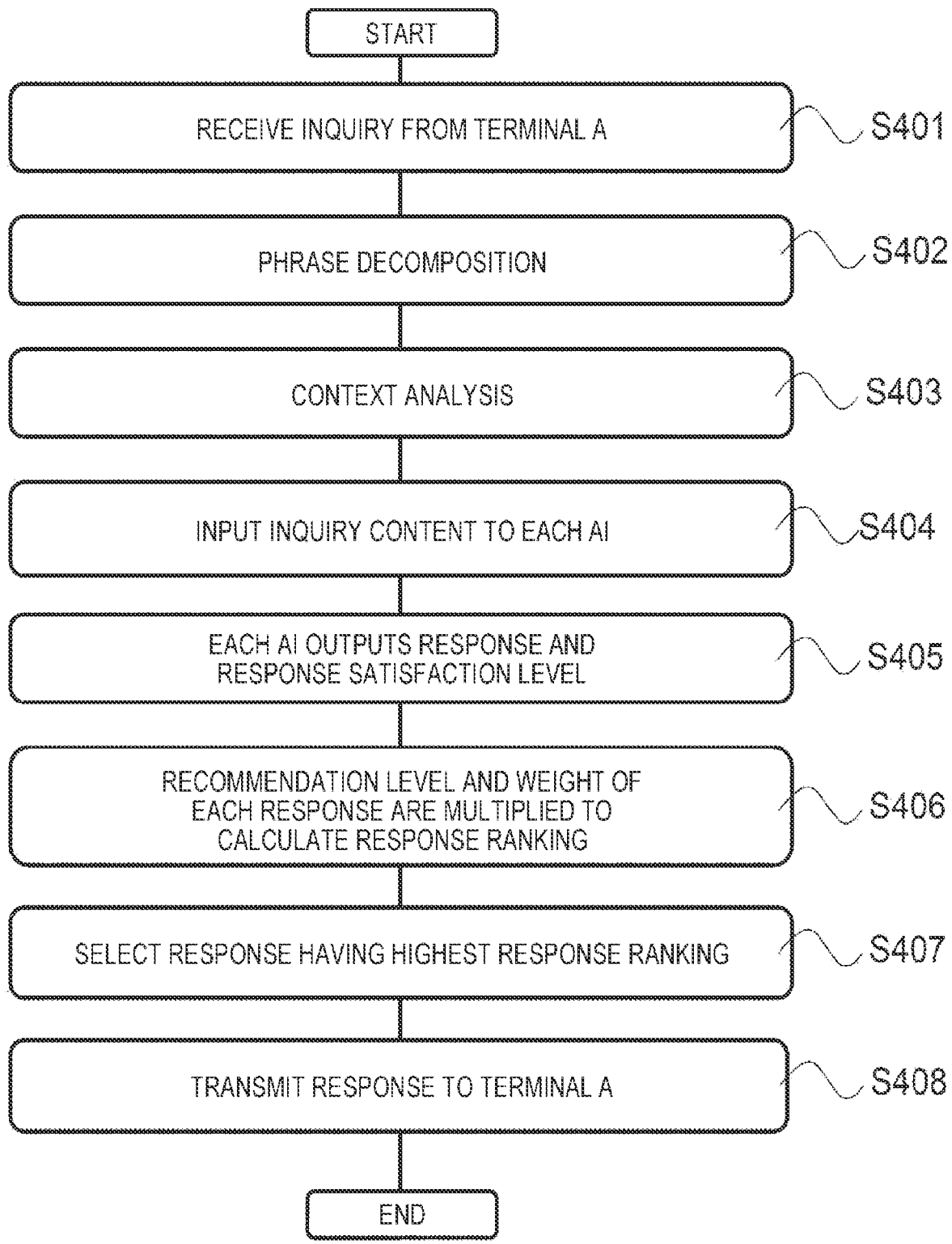
FIG. 9 is a flowchart when selecting a response from a plurality of AIs of an embodiment of the AI response system according to the present invention.
Figure 10:
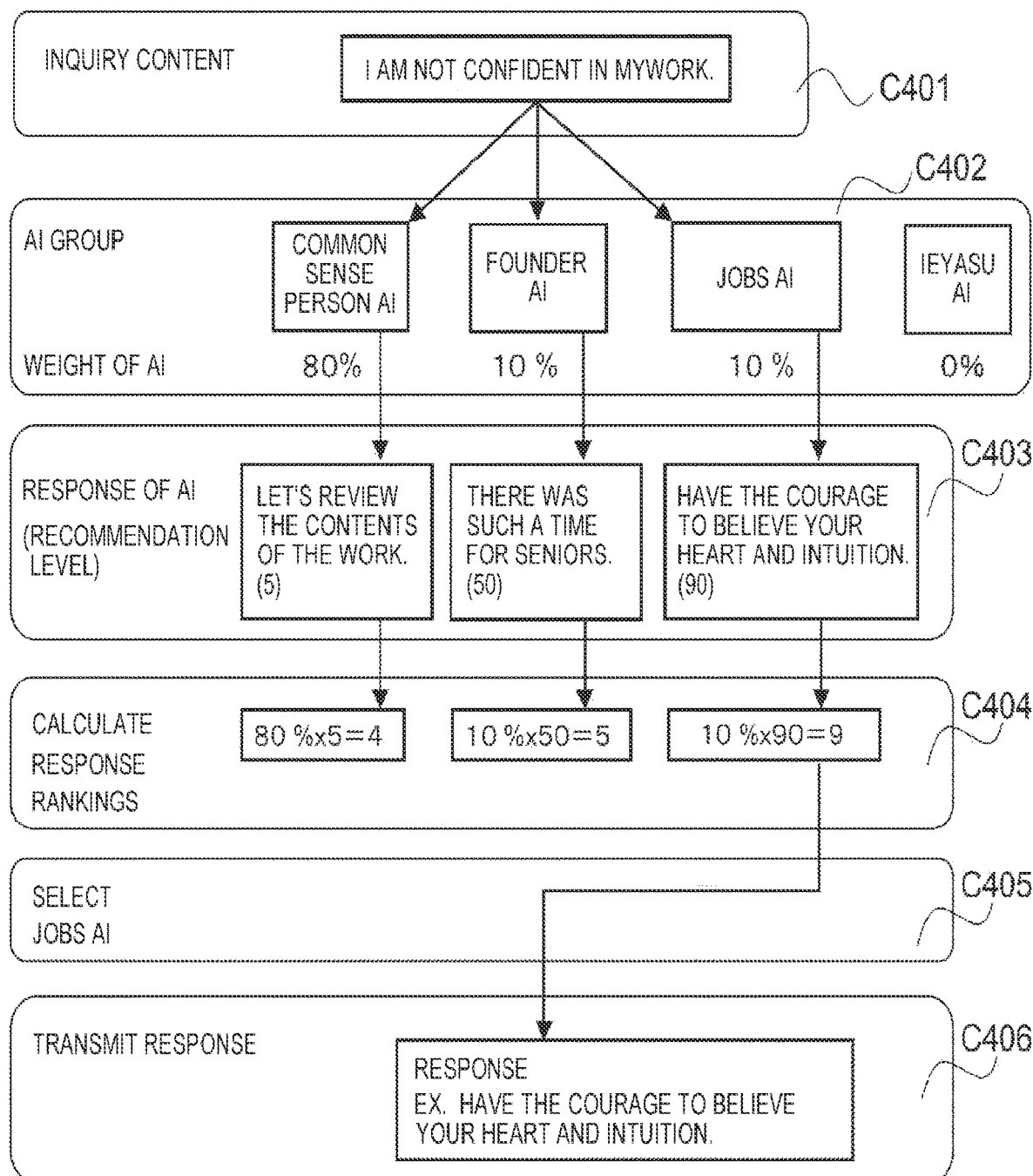
FIG. 10 is a schematic diagram when selecting a response from the plurality of AIs of the embodiment of the AI response system according to the present invention.

An example of selecting a response from a plurality of AIs is described with reference to FIGS. 9 and 10.

As AI, the system has been described on the basis of the AI based on large information, such as the general information AI 31 and the company internal information AI 32. However, responses from an AI group based on relatively small information may also be enumerated and selected.

For example, by giving a weighting to information, such as a case where it is wanted to give a priority to an advice from Jobs' analects, it is possible to build an AI system that further meets the inquirer.

In the present embodiment, a common sense person AI, a founder AI, a Jobs AI, an Ieyasu AI, and the like are prepared as AI, and the weight of AI is changed.

The weight is 80% for the common sense person AI, 10% for the founder AI, 10% for the Jobs AI, and 0% for the Ieyasu AI (C402).

As an inquiry from the terminal, a consultation "I am not confident in my work." is transmitted. The AI response unit 10 receives the inquiry (S401), performs phrase decomposition (S402) and context analysis (S403), and inputs the inquiry content to each AI (S404).

The AI group uses the common sense person AI, the founder AI, and the Jobs AI.

Each AI outputs a response and a recommendation level (S405). The response from the common sense person AI is "Let's review the contents of the work.", and the recommendation level is 5 out of 100. The recommendation level is a percentage of confidence with respect to the response. The recommendation level of 5 means that the confidence is low.

The response from the founder AI is "There was such a time for seniors. I had similar experience." and the recommendation level is 50 out of 100. The recommendation level of 50 means that there is confidence to some extent.

The response from the Jobs AI is "Have the courage to believe your heart and intuition.", and the recommendation level is 90 out of 100. The recommendation level of 90 means that the confidence is very high (C403).

The recommendation level and weight of each response are multiplied to calculate a response ranking (S406). The response ranking is 4 for the common sense person AI, 5 for the founder AI, and 9 for the Jobs AI (C404). Therefore, the response of the Jobs AI having a high response ranking is selected (S407, C405).

The response is transmitted (S408, C406).

With such a configuration, it is possible to obtain a response that meets the preference and thought of the user.

In addition, the response of each AI may be enumerated with displaying the recommendation level and the response priority. By doing so, the inquirer himself/herself can select the response and the range of responses can be widened.

Further, an aspect is also possible in which a comprehensive person AI with various personalities is generated in advance by combining and converging the thoughts and personalities of the plurality of AIs such as the common sense person AI, the founder AI, the Jobs AI and the Ieyasu AI, and the comprehensive person AI gives a response. By adopting such an aspect, a more accurate response where the thoughts of the plurality of AIs are converged can be obtained. At this time, an aspect is preferable in which the manager 82 and the user can select and determine in advance the AIs to be combined and converged from the AI group and can appropriately determine a combined distribution of each selected AI.

Embodiment 3

Explanation of Embodiment when there are Plurality of Respondents

Figure 11A:
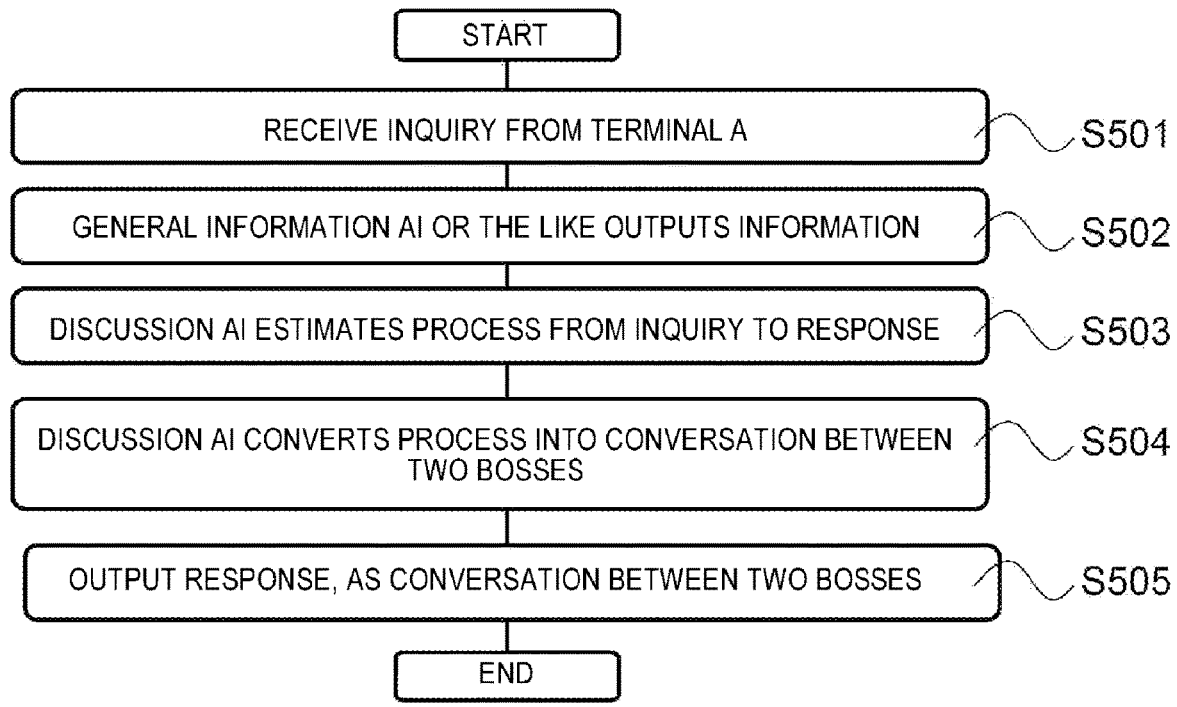
FIGS. 11A and 11B are a flowchart and a display diagram of responses when there are a plurality of respondents in an embodiment of the AI response system according to the present invention.
Figure 11B:
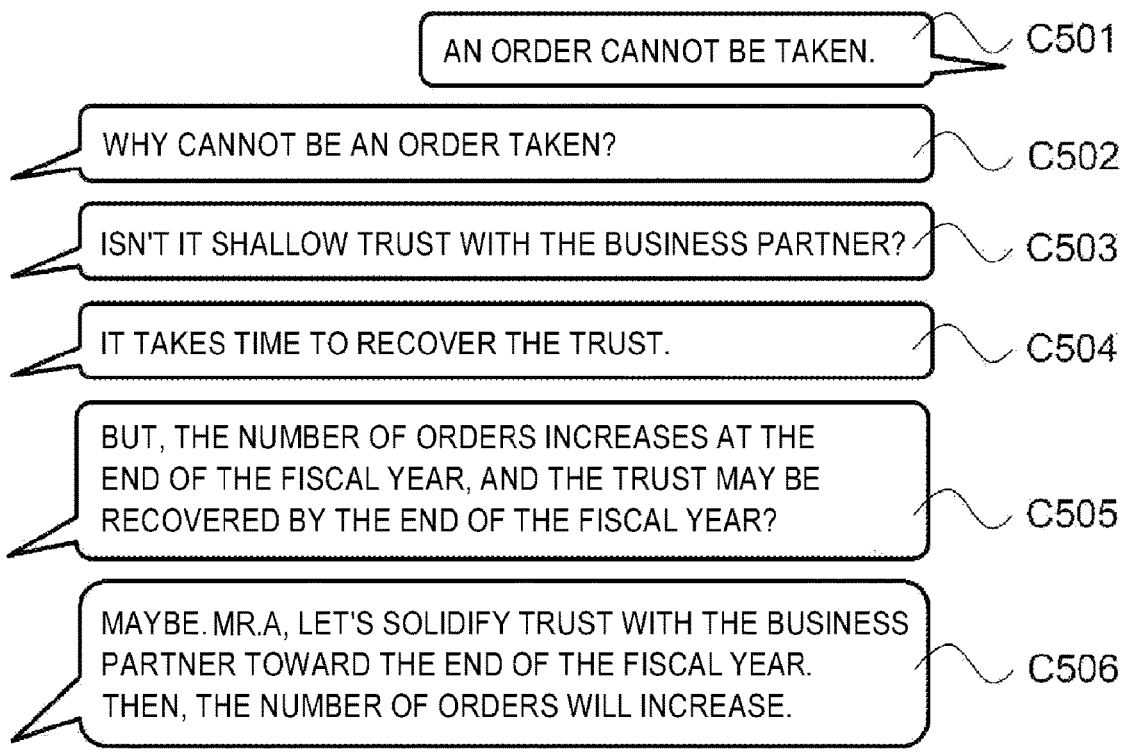

FIGS. 11A and 11B are a flowchart and a display diagram of responses when there are a plurality of respondents in an embodiment of the AI response system according to the present invention.

By using AI, it is possible to give an accurate response to the inquirer. However, depending on the content of the inquiry and the situation of the inquirer, it may be difficult to receive the response obediently. Therefore, it is possible to enhance a sense of convince of the inquirer by making the response from AI as if it is derived by two respondents after conference, and clarifying the process up to the response.

As an example, a case where an inquiry "An order cannot be taken" (C501) is received is described. The AI response unit 10 receives an inquiry from the mobile terminal 70 (S501). The response of the general information AI or the like is output (S502).

Here, a discussion AI estimates the process from the inquiry to the response (S503).

The discussion AI builds a discussion process of deriving a response from a content of an inquiry, a response made by the general information AI, and general information.

The discussion AI converts the process into a conversational form between two bosses (S504). Then, the conversational form is transmitted to the mobile terminal 70, as a conversation content of the two bosses (S505).

The response to the inquiry "An order cannot be taken." is "Solidify trust with the business partner toward the end of the fiscal year." However, the inquirer may not be convinced why this response is. However, by explaining the process up to the response as a conversation between the two, a rate that the inquirer can be convinced also increases. In this example, the conversation from C502 to C505 also deepens the inquirer's understanding.

As described above, according to the present embodiment, since the inquirer can know not only the mere response but also the process, it is easy to be convinced, a sense of trust in the AI response unit 10 is increased, and the work efficiency can be improved.

INDUSTRIAL APPLICABILITY

It is understood that the AI response system according to the present invention has a large industrial applicability for improving work efficiency by responding to inquiries by AI. Note that, it is also possible to use the present system to function as a facilitator at the time of a meeting, which contributes to the quick and appropriate progress of the meeting while there are many people who just deny or do not say anything in the meeting. In addition to being used in companies, the present system can be used in all situations where communication with people is required, such as schools, government offices, club activities, political environments and the like.

Further, the AI response system according to the present invention can be used in a multi-lingual manner by simultaneous translation/interpretation functions, and the like, and such a function greatly contributes to smooth work execution with overseas departments and overseas companies with time differences, and smooth communication with people overseas. Therefore, the industrial availability of the present invention is considered to be large.

Further, the AI response system according to the present invention can provide accurate instructions and reliable communication to the hearing-impaired and the elderly by means of the communication aspect by characters, and can also adopt a function of mutually converting characters and voice, which can be very effective for the visually impaired persons. In addition to characters and voice, it is also possible to adopt all communication means such as sign language function and Braille function, according to the users. As described above, according to the AI response system of the present invention, it is possible for healthy persons, disabled persons and elderly people to communicate without barriers, and in the age of 100 years of life, so-called a super-aging society, the system also contributes to promoting barrier-free and diversity of employment for companies while work style reform is being called for. Therefore, it is understood that the industrial applicability is extremely large.

REFERENCE SIGNS LIST

1: AI response system
10: AI response unit
11: terminal communication unit
12: information storage unit
13: external communication unit
20: inquiry receiving unit
21: language analysis
22: context understanding
23: frequently occurring conversation discrimination
30: learning unit
31: general information AI
32: company internal information AI
33: input unit
34: intermediate unit
35: output unit
40: response generation unit
50: interpersonal coordination unit
51: interpersonal coordination AI
60: importance level learning unit
61: important item AI
70: mobile terminal
71: display unit
72: application
73: character A
74: character B
80: Internet
81: company internal information
82: manager

The invention claimed is:

1. An artificial Intelligence (AI) response system configured to generate a response to an inquiry, the AI response system comprising:
 a learning unit that is trained using an inquiry, general information, a response, and a satisfaction level index for the response, to generate a learning result;
 a response generation unit configured, using the learning result of the learning unit, to generate, in response to inquiries from a plurality of mobile terminals, responses to be transmitted to each mobile terminal of the plurality of mobile terminals; and
 an interpersonal coordination system which has an interpersonal coordination unit that is configured to coordinate an interpersonal relationship and a work content, when a content of the inquiry relates to an interpersonal relationship,
 wherein the interpersonal coordination system is further configured to notify a response to coordinate an interpersonal relationship to an inquirer and a person involved,
 wherein a character of a respondent of the response is added to the response output from a mobile terminal, of the plurality of mobile terminals, from which the inquiry is received from,
 wherein the character is created or selected from a plurality of characters by a user of the mobile terminal,
 wherein each character of the plurality of characters includes a different graphical image, a different wording, or a different voice,
 wherein the response generation unit is further configured to apply a weight to a plurality of AIs, perform phrase decomposition and context analysis on the inquiry to obtain inquiry content of the inquiry, input the inquiry content into each AI of the plurality of AIs, output a response and a corresponding recommendation level for each AI of the plurality of AIs, multiply the recommendation level and the weight of each AI of the plurality of AIs to calculate a response ranking for each AI, and transmit a response of the AI having a highest ranking, and wherein the learning unit, the response generation unit, the interpersonal coordination system, and the interpersonal coordination unit are each implemented via at least one processor.

2. The AI response system according to claim 1, wherein the training is performed by using company internal information, in addition to the general information.

3. The AI response system according to claim 2, wherein the company internal information comprises any one of at least a company philosophy, a company culture, a company regulation, a policy, a history, a contract, a specification, a procedure manual, a story of a successive in-house successful person, customer information, management information, a business trip report of a business traveler, minutes of internal and external meetings, and employee competence information which includes qualification, experience, and performance record.

4. The AI response system according to claim 2, further comprising an important item notification system configured to issue a notification according to an importance level, in response to the inquiry, wherein the important item notification system includes an importance level learning unit that is trained using the inquiry, the company internal information, the general information, and an importance level index for an inquiry, to generate an additional learning result, wherein based on the additional learning result, the important item notification system is further configured to select an inquiry with high importance level and to notify the same to a manager, in response to inquiries from the plurality of mobile terminals, and wherein the important item notification system and the importance level learning unit are each implemented via at least one processor.

5. The AI response system according to claim 1, wherein the inquiry comprises one of at least a report, a contact, a consultation, an opinion, a hope, a question, a worry, a dream, likes and dislikes, and a self-introduction.

6. The AI response system according to claim 1, wherein the general information comprises any one of at least a biography, words of successful persons, questions and answers, a self-development book, a specialized book, gelotology, humorology, a current-affairs material, a national language, arithmetic, science, society, English, laws and regulations, ministerial ordinances, standards such as ISO and JIS, and intellectual property information which includes patent, trademark, copyright and the like.

7. The AI response system according to claim 1, wherein the response comprises any one of at least an instruction, an advice, a teaching, a coaching, a complimenting, a scolding, a motivating, a human ability enhancement, a social human ability enhancement, an office contact and a document preparation support.

8. The AI response system according to claim 1, wherein a part of the general information is selected by a manager or a user.

9. The AI response system according to claim 1, wherein the response generation unit is further configured to generate the response, according to a weighting for each information of a plurality of information obtained from a respective plurality of different AIs.

10. The AI response system according to claim 1, wherein the response generation unit is further configured to generate the response in a form of a conversation among a plurality of persons.

11. The AI response system according to claim 1, wherein each character of the plurality of characters further includes a different personality.

12. The AI response system according to claim 1, wherein the learning unit is further configured to output the different image, the different wording, or the different voice based on a preference of an inquirer of the inquiries.

13. The AI response system according to claim 1, further comprising:

an information storage unit configured to store information for each of the plurality of AIs, wherein the information for the AIs includes information about the inquirer and the content of the inquiry, and wherein the information storage unit is implemented via at least one processor.

14. The AI response system according to claim 1, wherein the character is output on a graphical computer display of the mobile terminal, or a speaker of the mobile terminal, or both the graphical computer display and the speaker.

* * * * *